(12) United States Patent
Feng et al.

(10) Patent No.: US 10,947,334 B2
(45) Date of Patent: Mar. 16, 2021

(54) ANIONIC THERMOVISCOSIFYING WATER-SOLUBLE POLYMERS, PREPARATION METHOD AND APPLICATION THEREOF

(71) Applicant: SICHUAN UNIVERSITY, Chengdu (CN)

(72) Inventors: Yujun Feng, Chengdu (CN); Mengmeng Wang, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 16/769,718

(22) PCT Filed: Jun. 5, 2019

(86) PCT No.: PCT/CN2019/090167
§ 371 (c)(1),
(2) Date: Jun. 4, 2020

(87) PCT Pub. No.: WO2019/192629
PCT Pub. Date: Oct. 10, 2019

(65) Prior Publication Data
US 2020/0369818 A1  Nov. 26, 2020

(30) Foreign Application Priority Data
Apr. 7, 2018 (CN) .................. 201810303492.X

(51) Int. Cl.
*C09K 8/588* (2006.01)
*C08F 287/00* (2006.01)
*B01J 13/00* (2006.01)

(52) U.S. Cl.
CPC ............. *C08F 287/00* (2013.01); *B01J 13/00* (2013.01); *C09K 8/588* (2013.01); *C09K 2208/00* (2013.01)

(58) Field of Classification Search
CPC ........ C08F 287/00; C01J 13/00; C09K 8/588; C09K 2208/00
See application file for complete search history.

(56) References Cited

U.S. PATENT DOCUMENTS

| 7,273,891 B1 | 9/2007 | Bromberg et al. |
| 2002/0198328 A1 | 12/2002 | L'alloret |
| 2003/0204014 A1* | 10/2003 | Yeung .................. C08F 290/06 524/558 |

FOREIGN PATENT DOCUMENTS

| CN | 102070754 A | 5/2011 |
| CN | 102464781 A | 5/2012 |

(Continued)

OTHER PUBLICATIONS

Mengmeng Wang et al., Thermo-Viscosifying Water-Soluble Polymers Synthesized through Inverse Emulsion Polymerization, Abstract Book 16th National CCS Conference on Colloid and Interface Chemistry—Sixth Branch: Application Colloid and Interface Chemistry, 2017, pp. 81-82.

(Continued)

*Primary Examiner* — Alicia Bland
(74) *Attorney, Agent, or Firm* — Bayramoglu Law Offices LLC

(57) ABSTRACT

A method for preparing an anionic thermoviscosifying water-soluble polymer includes the following steps: performing an inverse emulsion polymerization by using acrylamide, acrylic acid and Pluronic triblock polymer. The high reactivity of acrylamide and the inverse emulsion polymerization can increase the molecular weight of the thermoviscosifying polymer, and exhibit an obvious thermoviscosifying effect even at a low polymer concentration, which can reduce the application cost. The dissolution rate of the obtained polymer emulsion is significantly higher than the dissolution rate of the dry powder of the polymer. The (Continued)

obtained emulsion-diluted solution has a relatively strong thermoviscosifying behavior after further adding a small amount of reverse demulsifier, and the emulsion-diluted solution exhibits different thermoviscosifying behaviors as the amount of the reverse demulsifier is increased.

9 Claims, 11 Drawing Sheets

(56) References Cited

FOREIGN PATENT DOCUMENTS

| CN | 102464782 A | 5/2012 |
|---|---|---|
| CN | 102464797 A | 5/2012 |
| CN | 106084144 A | 11/2016 |
| CN | 107759738 A | 3/2018 |
| CN | 108586671 A | 9/2018 |
| EP | 0583814 A1 | 2/1994 |
| EP | 0583814 B1 | 10/1998 |

OTHER PUBLICATIONS

Shufu Peng et al., Light Scattering Study of the Formation and Structure of Partially Hydrolyzed Poly(acrylamide)/Calcium(II) Complexes, Macromolecules, 1999, pp. 585-589, No. 32.

Kenneth S. Sorbie, Polymer-improved Oil Recovery. 1991, pp. 1-340, CRC Press, Boca Raton.

D.Hourdet et al. Reversible thermothickening of aqueous polymer solutions, Polymer, 1994, pp. 2624-2630, vol. 35, No. 12.

Lev Bromberg, Novel Family of Thermogelling Materials via C—C Bonding between Poly(acrylic acid) and Poly (ethylene oxide)-b-poly(propylene oxide)-b-poly(ethylene oxide), J. Phys. Chem. B., 1998, pp. 1956-1963, vol. 102 No. 11.

J. Francois et al. Aqueous solutions of acrylamide-acrylic acid copolymers: stability in the presence of alkalinoearth cations, Polymer, 1997, pp. 6115-6127, vol. 38 No. 25.

* cited by examiner

ANIONIC THERMOVISCOSIFYING WATER-SOLUBLE POLYMERS, PREPARATION METHOD AND APPLICATION THEREOF

CROSS REFERENCE TO THE RELATED APPLICATIONS

This application is the national phase entry of International Application No. PCT/CN2019/090167, filed on Jun. 5, 2019, which is based upon and claims priority to Chinese Patent Application No. 201810303492.X, filed on Apr. 7, 2018, the entire contents of which are incorporated herein by reference.

TECHNICAL FIELD

The present invention belongs to the fields of smart water-soluble polymers and oil and gas production, and particularly relates to a class of thermoviscosifying water-soluble polymers, a preparation method and an application thereof.

BACKGROUND

With the rapid economic development in China, the dependence on oil and natural gas has gradually increased. Polymer flooding is an effective means in enhanced oil recovery (EOR) process to produce crude oil from underground. Water-soluble polymers, especially partially hydrolyzed polyacrylamide (HPAM), have been widely used in EOR industry due to its wide availability, low cost, good water solubility and extremely strong viscosifying power thereof. However, as the oil and gas exploitation shifted to deep wells, high temperature and high salinity in the reservoirs, and the use of produced water to prepare polymer solutions on site, strongly limit the use of HPAM because of its poor heat resistance and weak salt tolerance.

Numerous researches worldwide have proved that HPAM has an extremely strong viscosifying capability in fresh water due to the electrostatic repulsion among carboxylate groups on its skeleton. However, if produced water or formation connate water containing monovalent inorganic cations such as $Na^+$, $K^+$ is used for preparing polymer solutions, the intra- and intermolecular electrostatic repulsions among carboxylate groups would be screened, resulting in collapse of polymer coils and a significant reduction in viscosity of polymer solutions. If polyvalent cations such as $Ca^+$, $Mg^+$ are accompanied with the above monovalent salt, demixing or phase separation of the polymer solution would occur because the carboxylate groups will further complex with these metal ions to form a precipitate, eventually thickening power of such polymers will be diminished lose (S. Peng, et al. Macromolecules, 1999, 32: 585; J. Francois, et al. Polymer, 1997, 38: 6115). When the depth increases, the oilwell bottom temperature increases accordingly. Generally, the polymer solution follows Arrhenius law, and the viscosity thereof decreases with increasing temperature, i.e., polymer solutions always appear as "thermal thinning" fluids. When the temperature is higher than 75° C., the amide group in HPAM is further hydrolyzed into carboxylate moiety. If the solution contains polyvalent cations such as $Ca^{2+}$, $Mg^{2+}$, the phase separation will be accelerated and the thickening power will be completely lost (K. S. Sorbie. Polymer-improved Oil Recovery. CRC Press, Boca Raton, 1991).

Currently, two strategies are used to overcome the above drawbacks. One is maximizing the molecular weight of polymers to expect a relatively high viscosity retention after being subjected to high-temperature and high-salinity environment. The other is incorporation of thermal-resistant and salt-tolerant comonomer(s) onto the mainchain of acrylamide-based polymers. However, as the molecular weight of the polymer is increased, the long polymer chain is more susceptible to be degraded by shearing and stretching, when passing through consolidated porous media underground. Further, increasing the content of thermally-stable and salt-tolerant comonomer is not only detrimental to molecular weight of the polymers, but also costly to be used in practical uses.

An attempt was pioneered by Hourdet group to develop smart "thermoviscosifying polymer" or "thermothickening polymer" in early 1990s (D. Hourdet, et al. Polymer, 1994, 35: 2624). Unlike conventional HPAM polymers whose viscosity decreases upon increasing temperature, the viscosity of the thermoviscosifying polymer aqueous solution does not decrease with increasing temperature; on the contrary, it increases correspondingly with the increase of temperature. The basic principle of the "thermoviscosifying polymer" can be outlined as follows: a side chain having the characteristic of lower critical solution temperature (LCST) is introduced onto the backbone of a water-soluble polymer; when temperature exceeds LCST, these LCST side chains become more hydrophobic, thus, the water-soluble polymer transfers into amphiphilic; if polymer concentration is higher than a critical concentration, a three-dimensional network is formed by association of the pendant chains through van der Waals force, which increases the friction among polymer chains, and between polymer chains and solvent, thereby macroscopically exhibiting "thermoviscosifying" effect.

To date, thermoviscosifying polymers are prepared by graft modification, or solution polymerization, or bulk polymerization and dispersion polymerization.

The patent EP0583814B1 discloses that in the presence of N-(3-dimethyaminopropyl)-N'-ethylcarbodiimide (EDC) or dicyclohexylcarbodiimide (DCCI), O-(2-aminoethyl)-O'-methyl polyethylene glycol (POE) is grafted onto the mainchain of polyacrylic acid with the medium of water, and the graft ratio ranges from 30% to 35%. However, the molecular weight of the obtained polymer is merely $7 \times 10^5$ g·mol$^{-1}$, so the concentration of the polymer should be higher than 2% (w/w) to get obvious thermoviscosifying effect. Existing methods for preparing the thermoviscosifying polymer by graft technique are generally cumbrous, the distribution of side chains is not uniform, the molecular weight of the obtained polymer is rather low, and the use of the coupling agent is greatly harmful to the environment.

The patent disclosure CN102070754A provides a novel temperature-sensitive macromonomer, wherein the diacetone acrylamide and acrylamide are polymerized by a two-step method to obtain the temperature-sensitive macromonomer MPAD, and the temperature-sensitive macromonomer, the nonionic water-soluble monomer (such as acrylamide, etc.), and the anionic water-soluble monomer such as sodium acrylate, 2-acrylamido-2-methyl-1-propanesulfonic acid (AMPS), etc., are dissolved in water; after purging with nitrogen gas for a certain duration, a water-soluble initiator is added to react for 12-24 hours, and a transparent polymer gel is obtained by the solution polymerization. The patent CN102464782A discloses a method for preparing a thermoviscosifying polymer, wherein, 2-acrylamido-2-methyl-1-propanesulfonate acid sodium (NaAMPS), acrylamide, and methoxy polyethylene glycol maleamide are dissolved in water, after displacing oxygen with nitrogen gas for 30 minutes, certain amounts of potassium persulfate, urea, and 2,2'-azobis-(2-amidinopropane) dihydrochloride (V50) are added sequentially, and after 8 hours of reaction, the obtained polymer gel are cooled down following by cutting, freeze-drying, grinding, and sieving to get thermoviscosifying terpolymer powder product. The patent disclosure CN102464781A describes a process of solution polymerization of a thermoviscosifying terpolymer, wherein a macromonomer is firstly prepared in methanol by a two-step procedure, then the macromonomer, acrylamide, and NaAMPS are dissolved in water, after purging with nitrogen gas for 30 minutes, certain amounts of potassium persulfate, urea, and V50 are added separately to react for 2 hours to obtain the thermoviscosifying polymer. The patent disclosure CN102464797A provides methods for preparing an alkenyl ether monomer and a water-soluble thermoviscosifying polymer, wherein the alkenyl ether intermediate is prepared by using allyl glycidyl ether, polyethylene glycol monomethyl ether and triethylamine in a tetrahydrofuran, then after dissolving in chloroform, chlorosulfonic acid and acetic acid are added to synthesize the alkenyl ether monomer; the prepared alkenyl ether monomer and acrylamide are dissolved in water, and the initiator V50 is added for reacting for 20 hours to obtain the water-soluble thermoviscosifying polymer. These methods for preparing the thermoviscosifying polymers by solution polymerization have deficiencies such as the complicated preparation process of the monomer, uncontrollable molecular weight of the macromonomer, time-consuming, and not environmentally-benign, to name just a few.

The Bromberg's team (L. Bromberg. J. Phys. Chem. B. 1998, 102: 1956) synthesized a thermoviscosifying polymer by a bulk polymerization, wherein, 3.0 g of Pluronic copolymer was dissolved in 5.0 mL of acrylic acid (AA), after introducing nitrogen gas for 8 hours at 20° C., an aqueous solution of ammonium persulfate was added, and after heating to 75° C. and keeping for a certain duration, an inhibitor of 2,2,6,6-tetramethyl-1-oxo-piperidine was quickly added, and the polymer was obtained in liquid nitrogen. With this procedure, the Pluronic-poly(acrylic acid) (Pluronic-PAA) polymer is prepared in one step, and there is no need to use a large amount of solvent, thus, minimizing the environmental impact. However, the bulk polymerization has poor heat dissipation and can readily cause explosive polymerization because it is difficult to control the temperature. In addition, the content of the Pluronic copolymer used is high (37.5 wt %), thus the cost of the product must be high. Especially, the molecular weight of the polymer is relatively low (maximum $3.1 \times 10^6$ g·mol$^{-1}$), therefore, no thermoviscosifying effect can be obtained until polymer concentration exceeds 1% (w/v). So, the existing thermoviscosifying polymers synthesized by the bulk polymerization have the intrinsic limitations of low molecular weight and high cost for practical end use.

The patent disclosure U.S. Pat. No. 7,273,891 provides a procedure for preparing a thermoviscosifying polymer by dispersion polymerization, wherein 35 g of Pluronic copolymer is dissolved in 40 g sodium acrylate monomer with a neutralization degree of 6 mol %, V216 (alkylated polyvinylpyrrolidone) is dissolved in n-dodecane as a dispersant, and ammonium persulfate is used as initiator. After purging with nitrogen gas for a certain duration, the temperature is raised to 70° C. and maintained for 1 hour, then the reaction system is cooled down to room temperature, and the white solid is collected followed by filtration, washing with excess n-hexane, and drying under vacuum at 40° C. to obtain the thermoviscosifying polymer. This method requires a high content of the Pluronic temperature-sensitive polyether (47%, w/w), which makes final polymer very costly. Moreover, the viscosity of the solution that is obtained in the later stage is too large, and it is hard to post-treat the obtained solution. Further, it takes 2 days for the obtained dry powder to be dissolved in water, which is time-consuming. The existing thermoviscosifying polymers prepared by the dispersion polymerization also have the disadvantages such as high preparation cost, difficult post-treatment, time-consuming polymerization process, and others.

In summary, thermoviscosifying polymers with different structures and properties can be prepared so far; however, the prepared thermoviscosifying polymers only have lower molecular weight, show thermoviscosifying capability only at a high concentration, have a relatively high preparation and application cost, and need long time for dissolution prior to use, which is not conducive to the industrial application of the polymer.

The patent disclosure US20030204014A1 provides a method for preparing a thermoviscosifying polymer by an inverse emulsion polymerization, wherein sorbitol fatty acid ester and polyvinyl alcohol fatty acid ester are selected as binary emulsifiers, and the thermoviscosifying polymer is polymerized with NaAMPS, sodium acrylate and double bond modified polyether, with a molecular weight of $2 \times 10^6$ g·mol$^{-1}$ and an active content of 30 wt %. However, the obtained polymer solution cannot present good thermoviscosifying and salt-viscosifying effects below 0.5% (w/w) which is much higher than the currently-used polymer concentration for EOR use, and the molecular weight is still low. In the practical application of polymer flooding process, considering the investment-output ratio, the highest concentration of the polyacrylamide polymer that can be used is only 0.2% (w/w). Therefore, the polymers that show thermoviscosifying capability only at high concentrations are not suitable for EOR industry.

SUMMARY

In view of the drawbacks of the prior art, the objective of the present invention is to provide a new class of anionic thermoviscosifying water-soluble polymers. These polymers have higher molecular weight, exhibit good thermoviscosifying effect at a lower concentration, and the emulsion form of the polymer can be quickly dispersed in water, which is convenient to reduce the cost in practical applications. The present invention further provides a method for preparing the thermoviscosifying polymers, and the method is facile, highly efficient, cost-effective in production and advantageous for industrial application. Furthermore, the present invention provides examples of the anionic thermoviscosifying water-soluble polymers.

Compared with the existing Bromberg's direct bulk polymerization or dispersion polymerization of acrylic acid and the Pluronic triblock polymer, the present invention offers an inverse emulsion polymerization procedure by using acrylamide, acrylic acid and the Pluronic triblock copolymer. The high reactivity of both acrylamide acrylic acid and the inverse emulsion polymerization can increase the molecular weight of the thermoviscosifying polymers, and display an obvious thermoviscosifying effect even at a low concentration, thus, helping to reduce the application cost. The dissolution of the obtained polymer emulsion is significantly faster than that of the polymer powders. The diluted solution from the obtained emulsion exhibits a relatively strong thermoviscosifying ability after further adding a small amount of the reverse demulsifier, and the emulsion-diluted solution shows different thermoviscosifying behavior as the amount of the reverse demulsifier is increased.

The preparation method of the anionic thermoviscosifying water-soluble polymers of the present invention includes the following steps:

(1) an aqueous phase is prepared with acrylamide monomer, an anionic monomer, a temperature-sensitive polyether, and an inorganic salt, as well as deionized water, with pH values between 6.5 and 7.5; an oil phase was prepared by adding an emulsifier to an oil. The percentage of the aqueous phase ranges from 10% to 90% based on the total mass of both the aqueous and the oil phases. The aqueous phase and the oil phase are mixed under stirring to get the emulsion, or the aqueous phase is gradually added into the oil phase to get emulsified mixture. Next, an initiator is added in the emulsion under an inert gas atmosphere, and temperature is increased to 40-60° C. to initiate a polymerization or performing a photo-initiated polymerization by heating the emulsion system to 40-60° C. without adding the initiator. After completing the polymerization, keeping the temperature for 2-6 hours to obtain an inverse emulsion of the anionic thermoviscosifying water-soluble polymers;

wherein the mass percentages of various components in the aqueous phase are as follows: 20%-50% of the acrylamide monomer, 5%-15% of the anionic monomer, 1%-20% of the temperature-sensitive macromonomer, and 1%-10% of the inorganic salt; in the oil phase, a mass percentage of the emulsifier is 1%-20%; and (2) precipitating, washing, centrifuging, and drying the polymerized inverse emulsion to obtain a dry powder of the anionic thermoviscosifying water-soluble polymers; or adding a reverse demulsifier to the produced inverse emulsion to obtain the anionic thermoviscosifying water-soluble polymer emulsion, followed by dissolution in water and dilution to obtain desired diluted solutions.

Further, according to the technical solution of the present invention, the acrylamide monomer is an acrylamide or a mixture of acrylamide and other monomer, the other monomer is those selected from the group consisting of methacrylamide, N,N-dimethylacrylamide, methyl acrylate, ethyl acrylate, methyl methacrylate, ethyl methacrylate, and N-vinylpyrrolidone; and a mass percentage of the acrylamide in the mixture is greater than 50%.

Further, according to the technical solution of the present invention, the anionic monomer is a salt obtained by neutralization of acrylic acid, methacrylic acid, or 2-acrylamide-2-methylpropanesulfonic acid; a base used for the neutralization is at least one selected from the group consisting of ammonia water, sodium hydroxide, potassium hydroxide, sodium carbonate, and sodium bicarbonate.

Further, according to the technical solution of the present invention, the temperature-sensitive polyether is a triblock polymer of polyoxyethylene-polyoxypropylene-polyoxyethylene with a structural formula of:

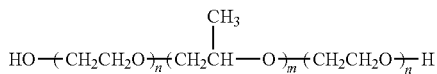

wherein, a structure and a property of the temperature-sensitive polyether vary with values of m and n, and the commonly used macromonomer may be F127, F108, F98, F88, F68, F38, P123, P105, P104, P103, P65, L121, L92, L81, L64, etc.

Further, according to the technical solution of the present invention, the inorganic salt is at least one selected from the group consisting of sodium chloride, sodium acetate, sodium nitrate, and potassium nitrate.

Further, according to the technical solution of the present invention, the emulsifier is a triblock polymeric emulsifier of a long-chain fatty acid-polyoxyethylene-long-chain fatty acid, such as Hymerper B246 (HB246), Hymerper B206 (HB206), etc.

Further, according to the technical solution of the present invention, the oil is at least one selected from the group consisting of a cycloalkane, an aromatic hydrocarbon, and a linear saturated or unsaturated hydrocarbon having 6 to 30 carbon atoms, such as mineral oil, kerosene, etc.

Further, according to the technical solution of the present invention, in step (1), the percentage of the aqueous phase ranging from 40% to 60% based on the total mass of the aqueous phase and the oil phase is preferred for mixing both phases.

Further, according to the technical solution of the present invention, the initiator is at least one selected from the group consisting of a hydrogen peroxide-based initiator, an azo-based initiator, and a benzoin-series initiator. The hydrogen peroxide-based initiator is ammonium peroxide (APS) or potassium peroxide (KPS); the azo-based initiator is 2,2'-azobis[2-(2-imidazolin-2-yl)propane]dihydrochloride (AIBI, Va-044, having an initiation temperature of 25-35° C.), azobisisobutyronitrile (AIBN, having an initiation temperature of 40-60° C. or photo-initiation at 365 nm). The benzoin-series initiator is benzoin dimethyl ether (DMPA or BDK, photo-initiation at 365 nm). A content of the initiator is 0.006%-0.3% based on the total mass of the monomers.

Further, according to the technical solution of the present invention, in a post-treatment of step (2), the obtained inverse emulsion is poured into excess acetone for a demulsification, and n-hexane and acetone are respectively used for washing repeatedly three times; and after a centrifugation, drying in a vacuum oven at 40° C. and then keeping for two days to obtain white powders of the thermoviscosifying water-soluble polymer.

The dry powder and the emulsion of the anionic thermoviscosifying water-soluble polymers prepared by the above method of the present invention, wherein a structural formula of the polymer may be expressed as follows:

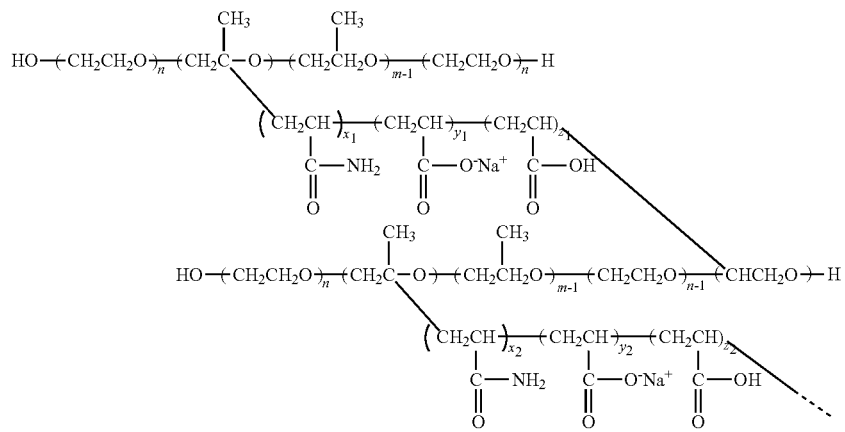

A molecular weight of the polymer is as high as $8.6\times10^6$ g·mol$^{-1}$, and an aqueous solution of the polymer at a relatively low concentration has a significant thermoviscosifying effect, showing a potential for practical use in a polymer flooding EOR process.

As for use, the anionic thermoviscosifying water-soluble polymers can be prepared as a dry powder by a freeze drying or a spray drying, then the dry powder is dissolved in water, and stirred until dissolution. The inverse emulsion of the anionic thermoviscosifying water-soluble polymers obtained by the polymerization may also be directly added a reverse demulsifier, stirred homogeneously, and diluted with water to obtain the diluted solution for end use. The reverse demulsifier may further be added to the diluted solution for later use, and the thermoviscosifying behavior of the obtained solution is shown in FIG. 8. The reverse demulsifier may be Hypinvert 3110 with an amount ranging from 1% to 10% based on the mass of the inverse emulsion. The mixing time of the reverse demulsifier and the inverse emulsion ranges from 2-120 minutes, and the stirring rate ranges from 50-200 rpm. The time for the reversed emulsion to be dissolved in water is 5-120 minutes, and the stirring rate is 200-800 rpm. If the reverse demulsifier is added to the diluted solution, the amount of the reverse demulsifier added is 0.1-5% of the total mass of the diluted solution, and the mixing time is 5-120 minutes.

Compared with the prior art, the present invention has the following advantages:

1. Compared to dry powders of thermoviscosifying water-soluble polymers obtained by other existing preparation procedures, the anionic thermoviscosifying water-soluble polymers prepared by the inverse emulsion polymerization of the present invention have a molecular weight up to $8.6\times10^6$ g·mol$^{-1}$, and show a stronger thermoviscosifying power. The thermoviscosifying effect can be obtained at a polymer concentration as low as 0.20% (w/w), which helps to reduce cost of the practical use.

2. The inverse emulsion of the polymer prepared by the present invention can be quickly dispersed in water after adding the reverse demulsifier, the time for dissolution is less than 10 min, no insoluble solid is found, and no large dissolution equipment is needed, thereby improving the on-site production efficiency.

3. The inversion emulsion of the anionic polyether thermoviscosifying water-soluble polymer synthesized by the inverse emulsion polymerization in the present invention has an active content up to 30% (w/w). The conversion rate is high, and residual monomer content is low. Moreover, the emulsion obtained after the polymerization has a low viscosity, which is convenient for post-treatment.

4. The emulsion of the anionic thermoviscosifying water-soluble polymers prepared by the method of the present invention can be reserved for a long time, specifically, more than 3 months of shelf life at room temperature.

5. The method of the present invention is a facile process with mild reaction condition, low energy consumption, low preparation cost, and is conducive to practical industry use.

6. The emulsion-diluted solution prepared by the present invention shows a relatively strong thermoviscosifying power after adding a small amount of the reverse demulsifier. As shown in FIG. 8, with the increase in the amount of the reverse demulsifier, the emulsion-diluted solution exhibits different thermoviscosifying effect.

7. In the present invention, the anionic thermoviscosifying water-soluble polymers are obtained by the inverse emulsion polymerization. The thermoviscosifying behavior can be adjusted by changing the species and content of the temperature-sensitive polyether, the content of the reverse demulsifier, the concentration of the polymer, the composition of the saline water, etc. The thermoviscosifying properties and experimental results of corresponding aging process and core flooding are shown in the attached drawings.

DETAILED DESCRIPTION OF THE EMBODIMENTS

Figure 1:
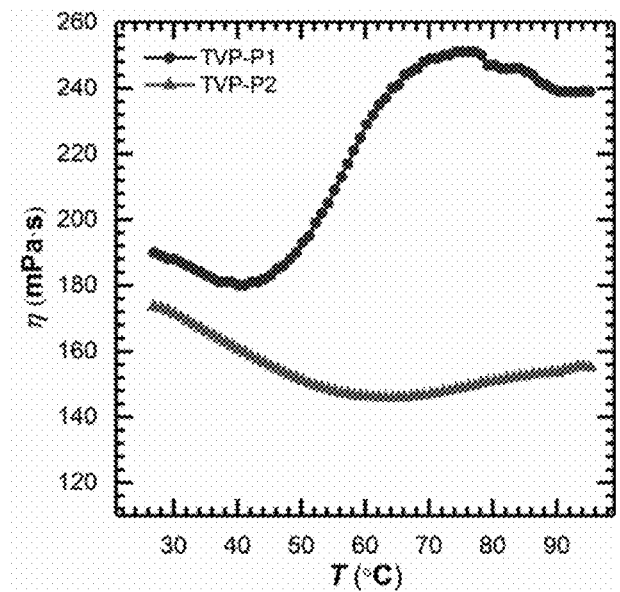
FIG. 1 is showing viscosity-temperature curves (shear rate $\dot{\gamma}=10$ s$^{-1}$) of aqueous solutions of TVP-P1 powder and TVP-P2 powder obtained in example 19 and example 20 at a concentration of 0.20%.
Figure 2:
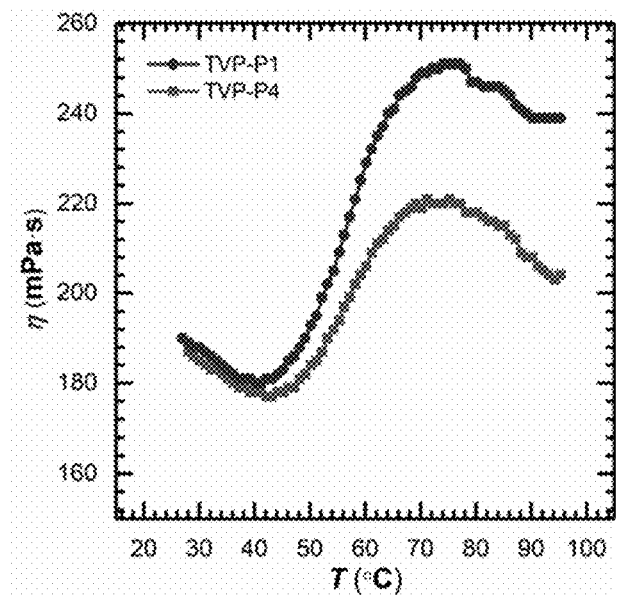
FIG. 2 is showing viscosity-temperature curves ($\dot{\gamma}=10$ s$^{-1}$) of aqueous solutions of TVP-P1 powder and TVP-P4 powder respectively obtained in example 19 and example 22 at a concentration of 0.20%.
Figure 3A:
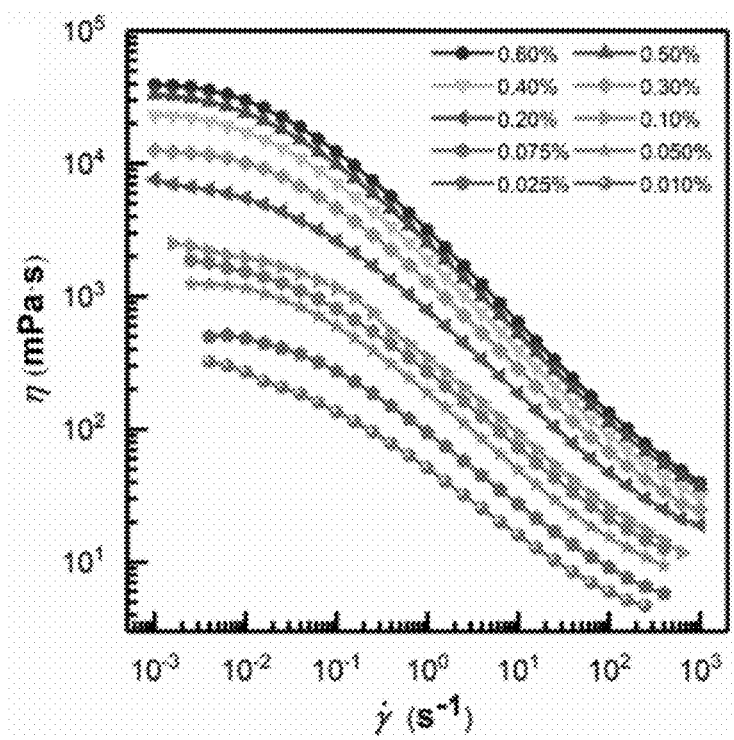
FIG. 3A is showing viscosity-shear rate curves (T=45° C.) of aqueous solutions of TVP-P1 powder obtained in example 19 at different concentrations.
Figure 3B:
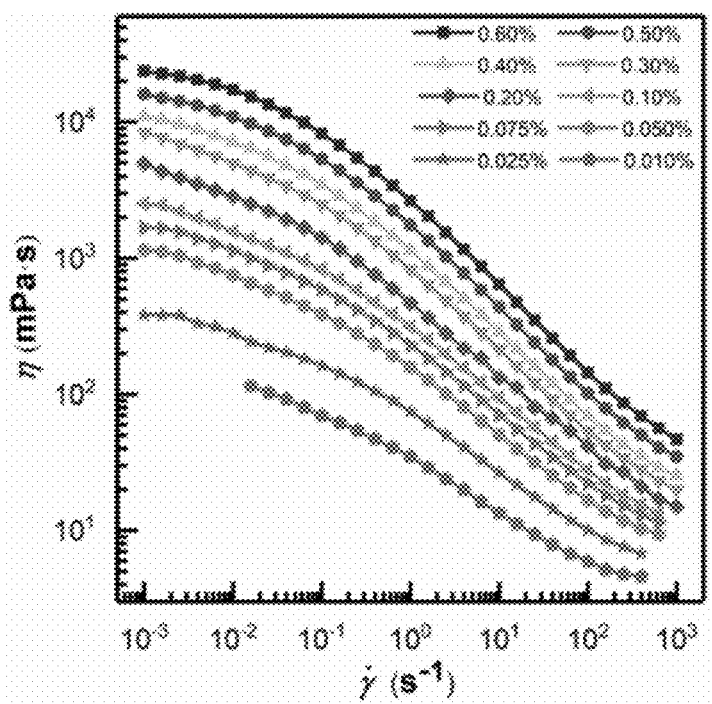
FIG. 3B is showing viscosity-shear rate curves (T=45° C.) of aqueous solutions of TVP-P2 powder obtained in example 20 at different concentrations.
Figure 3C:
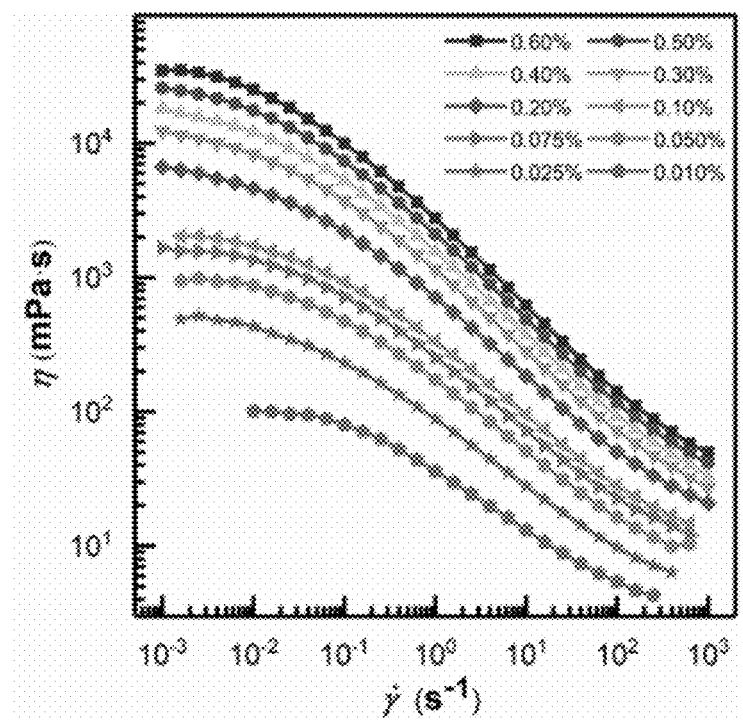
FIG. 3C is showing viscosity-shear rate curves (T=45° C.) of aqueous solutions of TVP-P3 powder obtained in example 21 at different concentrations.
Figure 3D:
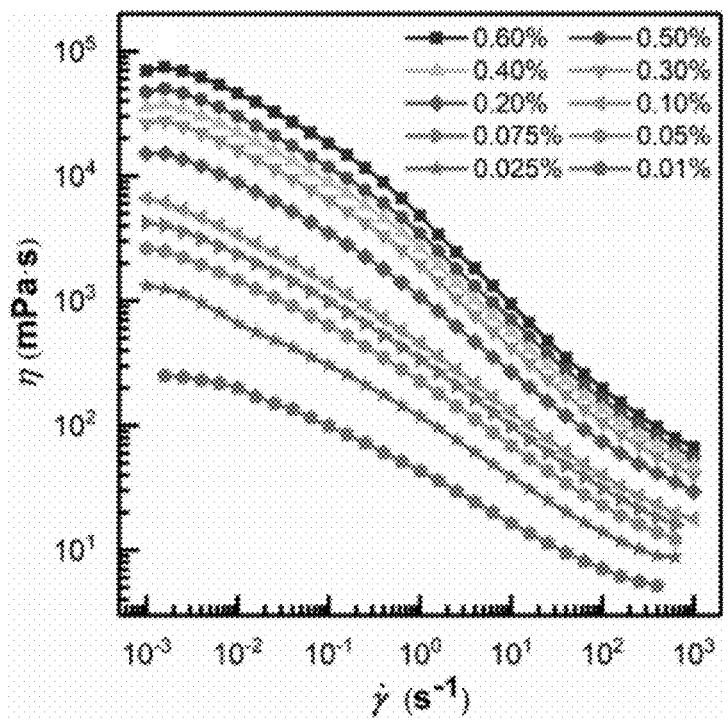
FIG. 3D is showing viscosity-shear rate curves (T=45° C.) of aqueous solutions of PAMA powder obtained in example 24 at different concentrations.
Figure 4A:
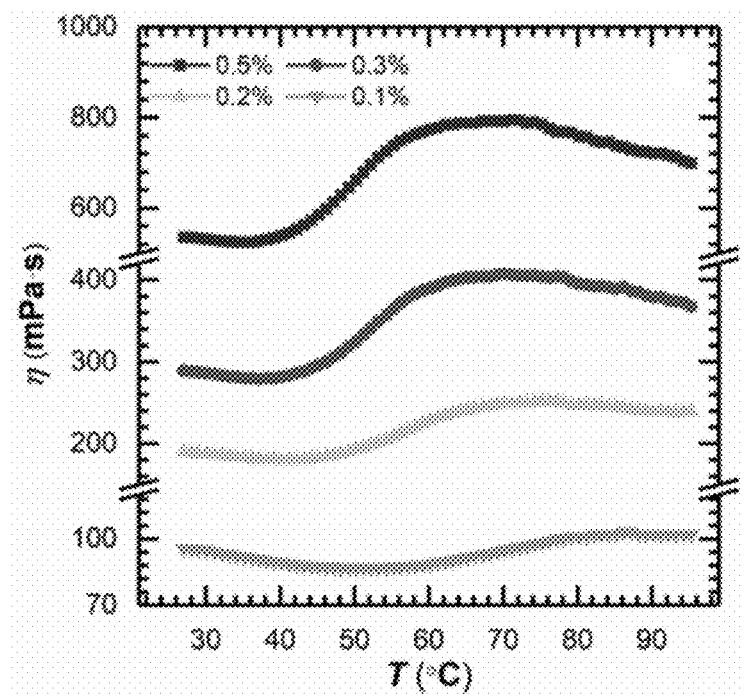
FIG. 4A is showing viscosity-temperature curves ($\dot{\gamma}=10$ s$^{-1}$) of aqueous solutions of TVP-P1 powder obtained in example 19 at different concentrations.
Figure 4B:
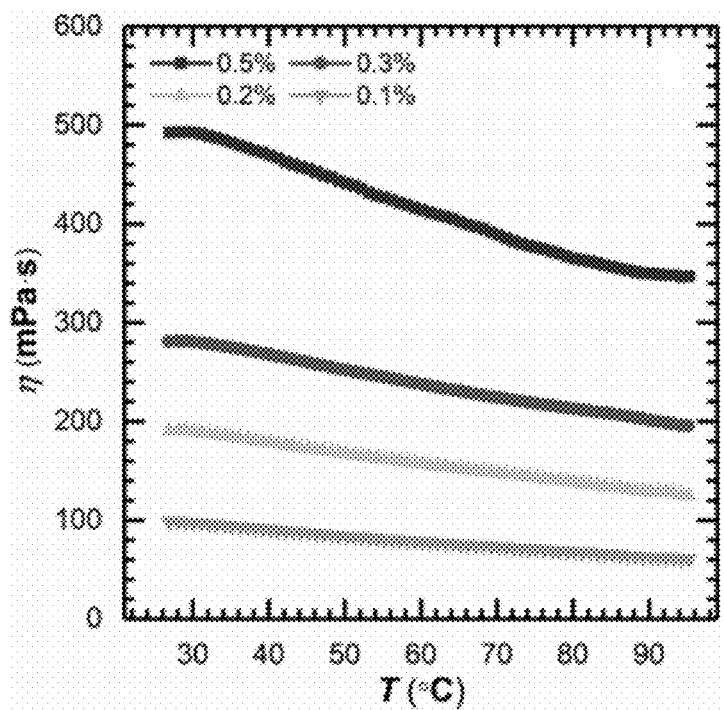
FIG. 4B is showing viscosity-temperature curves ($\dot{\gamma}=10$ s$^{-1}$) of aqueous solutions of PAMA powder obtained in example 24 at different concentrations.
Figure 5A:
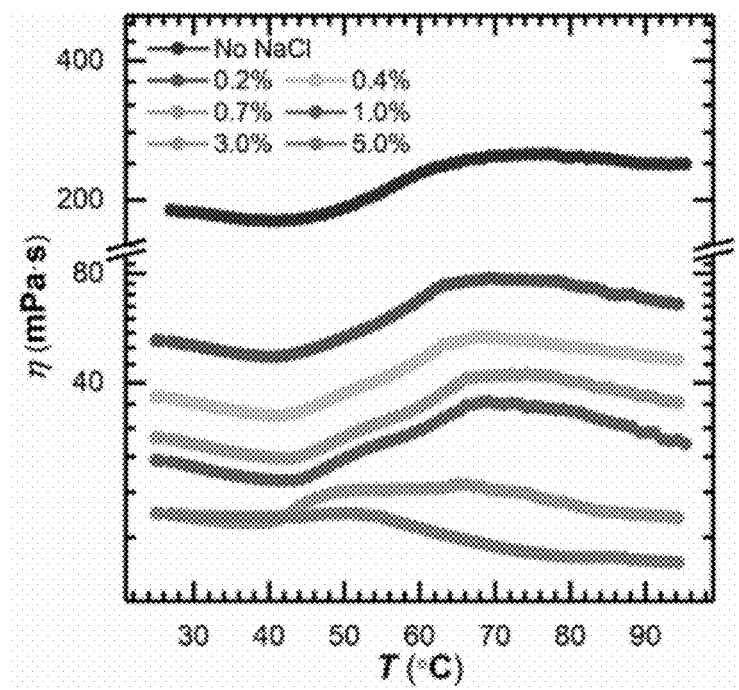
FIG. 5A is showing viscosity-temperature curves ($\dot{\gamma}=10$ s$^{-1}$) of aqueous solutions (0.20%) of TVP-P1 powder obtained in example 19 at different concentrations of saline water.
Figure 5B:
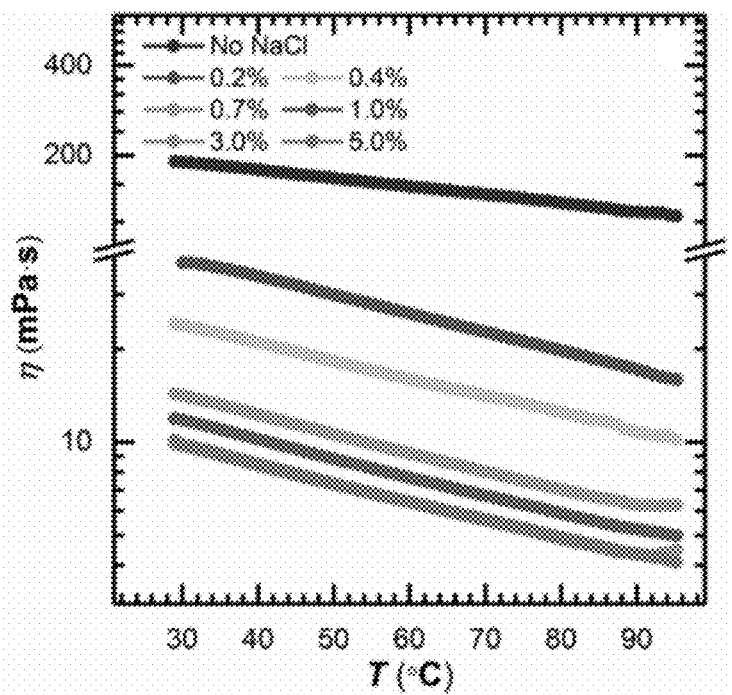
FIG. 5B is showing viscosity-temperature curves ($\dot{\gamma}=10$ s$^{-1}$) of aqueous solutions (0.20%) of PAMA powder obtained in example 24 at different concentrations of saline water.
Figure 6A:
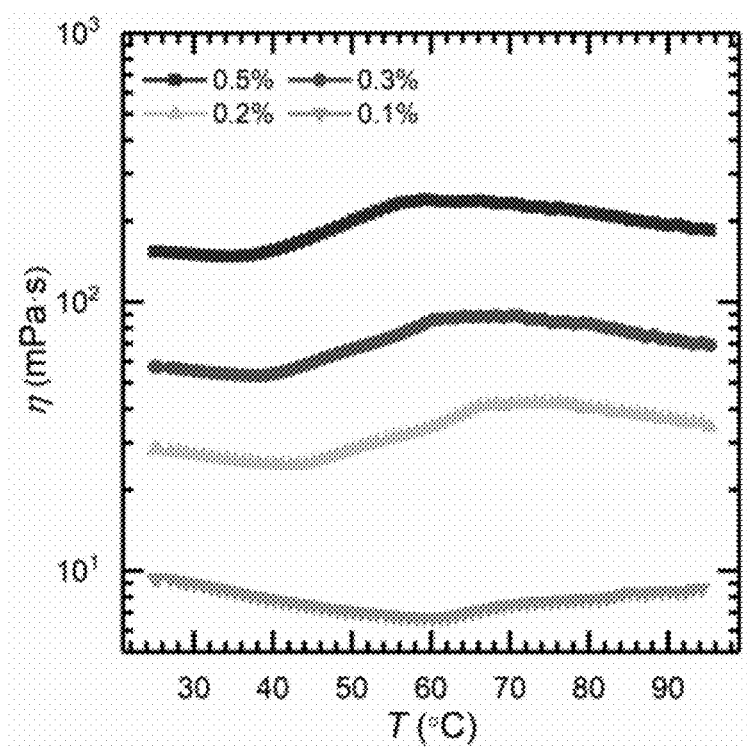
FIG. 6A is showing viscosity-temperature curves (0.45% NaCl solution, $\dot{\gamma}=10$ s$^{-1}$) of aqueous solutions of TVP-P1 powder obtained in example 19 in saline water at different concentrations.
Figure 6B:
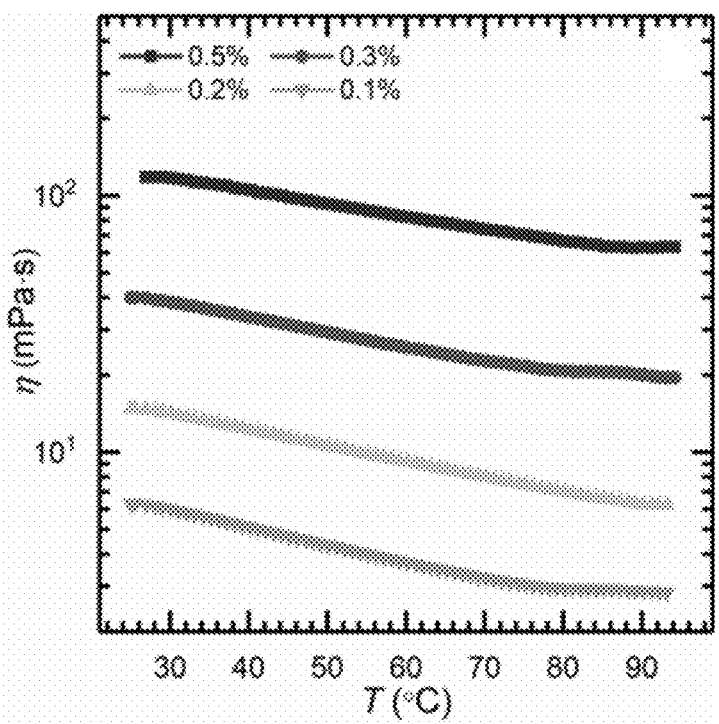
FIG. 6B is showing viscosity-temperature curves (0.45% NaCl solution, $\dot{\gamma}=10$ s$^{-1}$) of aqueous solutions of PAMA powder obtained in example 24 in saline water at different concentrations.
Figure 7:
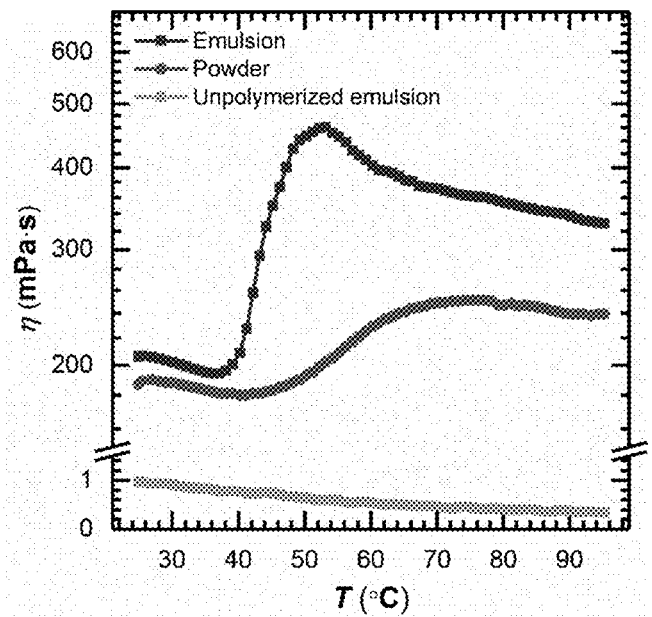
FIG. 7 is showing viscosity-temperature curves (pure water, $\dot{\gamma}=10$ s$^{-1}$) of an emulsion-diluted solution of ETVP-P1, an aqueous solution of TVP-P1 powder, and an unpolymerized emulsion-diluted solution (0.20%) according to example 19.
Figure 8:
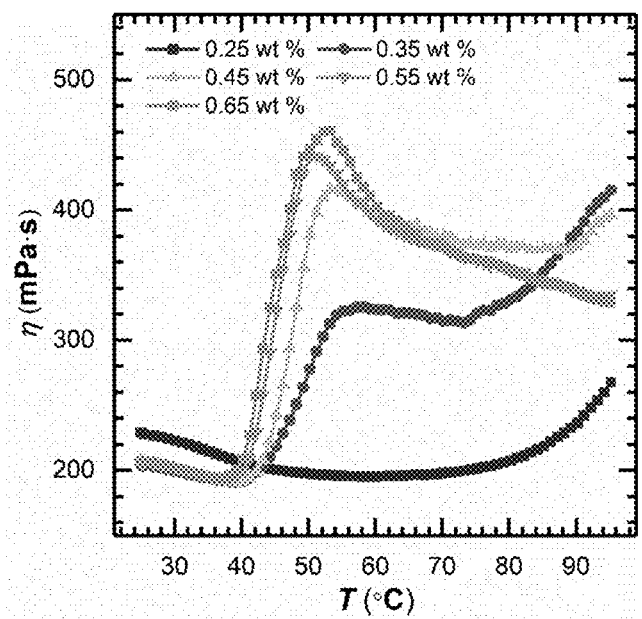
FIG. 8 is showing viscosity-temperature curves (pure water, $\dot{\gamma}=10$ s$^{-1}$) of an emulsion-diluted solution (0.20%) of ETVP-P1 obtained in example 19 at different adding amount of a reverse demulsifier.
Figure 9:
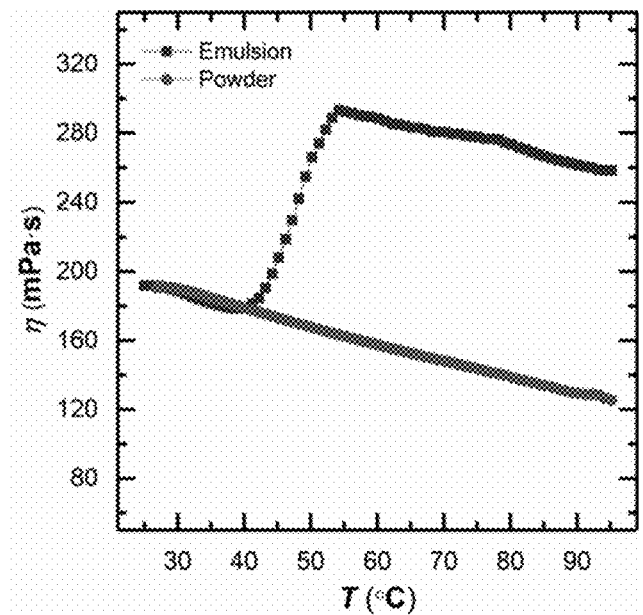
FIG. 9 is showing viscosity-temperature curves (pure water, $\dot{\gamma}=10$ s$^{-1}$) of an emulsion-diluted solution of EPAMA and an aqueous solution (0.20%) of PAMA powder according to example 24.

The following examples further describe the present invention in detail. The examples are intended to help those skilled in the art to understand the present invention completely, but are not intended to limit the present invention in any way.

In the following examples, mass percentages of various components in the aqueous phase are recited based on 100% of the total mass of the aqueous phase, and mass percentages of various components in the oil phase are recited based on 100% of the total mass of the oil phase.

The molecular weight of the polymers in the following examples is determined by static light scattering.

The initial viscosity of the polymer solutions used in the subsequent aging, flow and core flooding experiments in the following examples are consistent. The concentration of the emulsion-diluted solution is measured by the concentration of the anionic thermoviscosifying water-soluble polymers, and the active content of the emulsion should be calculated upon dilution: active content of emulsion=mass of anionic thermoviscosifying water–soluble polymer/mass of emulsion×100%.

Examples 1-18

In the following tables, the optimal inverse emulsion ratio was examined from four aspects, i.e., emulsifier type, oil-water ratio, monomer loading, and presence or absence of NaAA, to obtain the optimal anionic thermoviscosifying polymer.

TABLE 1

Effect of nature of emulsifier on emulsion state

| No. | Oil phase | | Oil-water ratio | Emulsion state | Note[a] |
|---|---|---|---|---|---|
| | Oil | Emulsifier | | | |
| 1 | Mineral oil | Span 85 | 5:5 | O/W | x |
| 2 | Mineral oil | Span 85:HB246 = 21:1 | 5:5 | O/W | x |
| 3 | Mineral oil | Span 85:HB246 = 7:1 | 5:5 | O/W | x |
| 4 | Mineral oil | Span 85:HB246 = 4:1 | 5:5 | O/W | x |
| 5 | Mineral oil | Span 85:HB246 = 2:1 | 5:5 | O/W | x |
| 6 | Mineral oil | MOA-3 | 5:5 | O/W | x |
| 7 | Mineral oil | HB246 | 5:5 | W/O | ✓ |

[a]"x" denotes that no inverse emulsion is successfully prepared, and "✓" denotes that an inverse emulsion is successfully prepared.

TABLE 2

Effect of oil-water ratio on emulsion state

| No. | Oil phase | | Oil-water ratio | Emulsion state | Note[a] |
|---|---|---|---|---|---|
| | Oil | Emulsifier | | | |
| 1 | Mineral oil | Span 85 | 5:5 | O/W | x |
| 8 | Mineral oil | Span 85 | 4.5:5.5 | O/W | x |
| 9 | Mineral oil | Span 85 | 4:6 | O/W | x |
| 10 | Mineral oil | Span 85 | 3.5:6.5 | O/W | x |
| 11 | Mineral oil | Span 85 | 3:7 | O/W | x |
| 2 | Mineral oil | Span 85:HB246 = 2:1 | 5:5 | O/W | x |
| 12 | Mineral oil | Span 85:HB246 = 2:1 | 4.5:5.5 | O/W | x |
| 13 | Mineral oil | Span 85:HB246 = 2:1 | 4:6 | O/W | x |

TABLE 2-continued

Effect of oil-water ratio on emulsion state

| | Oil phase | | Oil-water | Emulsion | |
|---|---|---|---|---|---|
| No. | Oil | Emulsifier | ratio | state | Note[a] |
| 14 | Mineral oil | Span 85:HB246 = 2:1 | 3:7 | O/W | x |
| 7 | Mineral oil | HB246 | 5:5 | W/O | ✓ |
| 15 | Mineral oil | HB246 | 4.5:5.5 | W/O | ✓ |
| 16 | Mineral oil | HB246 | 4:6 | O/W | x |

[a]"x" denotes that no inverse emulsion is successfully prepared, and "✓" denotes that an inverse emulsion is successfully prepared.

TABLE 3

Effect of monomer loading on the thickening power of produced polymer

| | Oil phase | | $m_{AM}/m_{F127}$ | Oil-water | Polymer | |
|---|---|---|---|---|---|---|
| No. | Oil | Emulsifier | (wt/wt) | ratio | property | Note[a] |
| 15 | Mineral oil | HB246 | 7:1.5 | 4.5:5.5 | Vscosifying | ✓ |
| 17 | Mineral oil | HB246 | 7:0.1 | 4.5:5.5 | Less viscosifying | x |

[a]"x" denotes that the obtained dry powder of the polymer has no thermoviscosifying capacity, and "✓" denotes that the obtained dry powder of the polymer has the thermoviscosifying capacity.

TABLE 4

Effect of presence or absence of NaAA monomer on polymer property

| | Oil phase | | $m_{AM}/m_{F127}$ | NaAA (in aqueous | Oil-water | | |
|---|---|---|---|---|---|---|---|
| No. | Oil | Emulsifier | (wt/wt) | phase) | ratio | Polymer | Note[a] |
| 15 | Mineral oil | HB246 | 7:1.5 | 0 | 4.5:5.5 | Poor solubility | x |
| 18 | Mineral oil | HB246 | 7:1.5 | 4.9% | 4.5:5.5 | Rapid dissolution | ✓ |

[a]"x" denotes that the obtained dry powder of the polymer requires a long time to be dissolved dissolution, and "✓" denotes that the obtained dry powder of the polymer can be rapidly dissolved in water.

Taking example 18 as an example. For preparing an aqueous phase, 31.6% (w/w, the same hereinafter) of acrylamide, 9.5% of sodium acrylate, 8.6% of F127, and 5.0% of sodium chloride were dissolved in deionized water, and the pH value was adjusted to 7.0. 14% of emulsifier HB246 was dissolved in mineral oil, followed by heating to 50° C.; after dissolution of comonomers, the oil phase and the aqueous phase (mass ratio of 4.5:5.5) were successively added to an agitator with homogeneous stirring and emulsification at a high speed. The obtained emulsion was a stable water in oil (W/O) emulsion.

Example 19

For preparing an aqueous phase, 31.7% (w/w, the same hereinafter) of acrylamide, 9.5% of sodium acrylate, 8.6% of F127, and 5.0% of sodium chloride were dissolved in deionized water, and the pH value was adjusted to 7.0. 14% of emulsifier HB246 was dissolved in mineral oil, followed by heating to 50° C.; after dissolution of the comonomers, the oil phase and the aqueous phase (mass ratio, 4.5:5.5) were successively added to an agitator to be emulsified homogeneously under stirring. After the emulsification was completed, the mixture was transferred to a 250 mL four-necked bottom flask equipped with a stirrer, a nitrogen inlet, and a digital thermometer, and the temperature was increased to 45° C. in a water bath. After purging with the nitrogen gas for a certain duration, the initiator AIBN was added, and the polymerization was started. When the temperature reached 45° C., the mixture was continuously stirred at 45° C. for 2 hours. The inverse emulsion ETVP-P1 of the anionic thermoviscosifying water-soluble polymers was obtained, and the obtained inverse emulsion was precipitated, washed, centrifuged, and freeze-dried to obtain dry powders, i.e., TVP-P1. The molecular weight of the polymer was determined to be $7.8 \times 10^6$ g·mol$^{-1}$.

Example 20

For preparing an aqueous phase, 31.7% (w/w, the same hereinafter) of acrylamide, 9.5% of sodium acrylate, 8.6% of F108, and 5.0% of sodium chloride were dissolved in deionized water, and the pH value was adjusted to 7.0. 14% of emulsifier HB246 was dissolved in mineral oil, followed by heating to 45° C.; after dissolution of the comonomers, the oil phase and the aqueous phase (mass ratio, 4.5:5.5) were successively added to an agitator to be emulsified homogeneously under stirring. After the emulsification was completed, the mixture was transferred to a 250 mL four-necked bottom flask equipped with a stirrer, a nitrogen inlet, and a digital thermometer, and the temperature was increased to 45° C. in a water bath. After purging with nitrogen gas for a certain duration, the initiator AIBN was added, and the polymerization was started. When the thermometer reached 45° C., the mixture was continuously stirred at 45° C. for 2 hours. The inverse emulsion ETVP-P2 of the anionic thermoviscosifying water-soluble polymers was obtained, and the obtained inverse emulsion was precipitated, washed, centrifuged, and freeze-dried to obtain dry powders, i.e., TVP-P2. The molecular weight of the polymer was determined to be $7.4 \times 10^6$ g·mol$^{-1}$.

Example 21

For preparing an aqueous phase, 31.7% (w/w, the same hereinafter) of acrylamide, 9.5% of sodium acrylate, 8.6% of F68, and 5.0% of sodium chloride were dissolved in deionized water, and the pH value was adjusted to 7.0. 14% of emulsifier HB246 was dissolved in mineral oil, followed by heating to 45° C.; after dissolution of the comonomers, the oil phase and the aqueous phase (mass ratio, 4.5:5.5) were successively added to an agitator to be emulsified homogeneously under stirring. After the emulsification was completed, the mixture was transferred to a 250 mL four-necked bottom flask equipped with a stirrer, a nitrogen inlet, and a digital thermometer, and the temperature was increased to 45° C. in a water bath. After purging with nitrogen gas for a certain duration, the initiator AIBN was added, and the polymerization was started. When the temperature reached 45° C., the mixture was continuously stirred at 45° C. for 2 hours. The inverse emulsion ETVP-P3 of the anionic thermoviscosifying water-soluble polymers was obtained, and the obtained inverse emulsion was precipitated, washed, centrifuged, and freeze-dried to obtain dry powders, i.e., TVP-P3. The molecular weight of the polymer was determined to be $7.5 \times 10^6$ g·mol$^{-1}$.

Example 22

For preparing an aqueous phase, 36.8% (w/w, the same hereinafter) of acrylamide, 9.5% of sodium acrylate, 3.3% of F127, and 5.0% of sodium chloride were dissolved in deionized water, and the pH value was adjusted to 7.0. 14% of emulsifier HB246 was dissolved in mineral oil, followed by heating to 50° C.; after dissolution of the comonomers, the oil phase and the aqueous phase (mass ratio, 4.5:5.5) were successively added to an agitator to be emulsified homogeneously under stirring. After the emulsification was completed, the mixture was transferred to a 250 mL four-necked bottom flask equipped with a stirrer, a nitrogen inlet, and a digital thermometer, and the temperature was increased to 45° C. in a water bath. After purging with nitrogen gas for a certain duration, the initiator AIBN was added, and the polymerization was started. When the temperature reached 45° C., the mixture was continuously stirred at 45° C. for 2 hours. The inverse emulsion ETVP-P4 of the anionic thermoviscosifying water-soluble polymers was obtained, and the obtained inverse emulsion was precipitated, washed, centrifuged, and freeze-dried to obtain dry powders, i.e., TVP-P4. The molecular weight of the polymer was determined to be $8.3 \times 10^6$ g·mol$^{-1}$.

Example 23

For preparing an aqueous phase, 23.7% (w/w, the same hereinafter) of acrylamide, 9.5% of sodium acrylate, 16.6% of F127, and 5.0% of sodium chloride were dissolved in deionized water, and the pH value was adjusted to 7.0. 14% of emulsifier HB246 was dissolved in mineral oil, followed by heating to 50° C.; after dissolution of the comonomers, the oil phase and the aqueous phase (mass ratio, 4.5:5.5) were successively added to an agitator to be emulsified homogeneously under stirring. After the emulsification was completed, the mixture was transferred to a 250 mL four-necked bottom flask equipped with a stirrer, a nitrogen inlet, and a digital thermometer, and the temperature was increased to 45° C. in a water bath. After purging with nitrogen gas for a certain duration, the initiator AIBN was added, and the polymerization was started. When the temperature reached 45° C., the mixture was continuously stirred at 45° C. for 2 hours. The inverse emulsion ETVP-P5 of the anionic thermoviscosifying water-soluble polymers was obtained, and the obtained inverse emulsion was precipitated, washed, centrifuged, and freeze-dried to obtain dry powders, i.e., TVP-P5. The molecular weight of the polymer was determined to be $5.2 \times 10^6$ g·mol$^{-1}$.

Example 24

For preparing an aqueous phase, 40.3% (w/w, the same hereinafter) of acrylamide, 9.5% of sodium acrylate, and 5.0% of sodium chloride were dissolved in deionized water, and the pH value was adjusted to 7.0. 14% of emulsifier HB246 was dissolved in mineral oil, followed by heating to 50° C.; after dissolution of the comonomers, the oil phase and the aqueous phase (mass ratio, 4.5:5.5) were successively added to an agitator to be emulsified homogeneously under stirring. After the emulsification was completed, the mixture was transferred to a 250 mL four-necked bottom flask equipped with a stirrer, a nitrogen inlet, and a digital thermometer, and the temperature was increased to 45° C. in a water bath. After purging with nitrogen gas for a certain duration, the initiator AIBN was added, and the polymerization was started. When the temperature reached 45° C., the mixture was continuously stirred at 45° C. for 2 hours. The inverse emulsion EPAMA of the anionic thermoviscosifying water-soluble polymers was obtained, and the obtained inverse emulsion was precipitated, washed, centrifuged, and freeze-dried to obtain dry powders, i.e., PAMA. The molecular weight of the polymer was determined to be $8.6 \times 10^6$ g·mol$^{-1}$.

For the inverse emulsions and the aqueous solutions of the polymer dry powder prepared in examples 19-24, the viscosity of the solutions was measured as a function of temperature or shear rate. Further, viscosity of different polymer concentrations in different salt concentrations were measured. Moreover, viscosity of emulsion-diluted solutions with different amounts of reverse demulsifier added were measured at different temperatures. The results were shown in FIG. 1, FIG. 2, FIGS. 3A-3D, FIGS. 4A-4B, FIGS. 5A-5B, FIGS. 6A-6B, FIG. 7 and FIG. 9. The obtained dry powders of the thermoviscosifying polymers have significant thermoviscosifying power in both pure water and saline water, and the obtained emulsion-diluted solutions of the polymers also have significant thermoviscosifying power, and with increasing the amount of the reverse demulsifier, the thermoviscosifying power becomes more obvious.

Example 25

For preparing an aqueous phase, 26.6% (w/w, the same hereinafter) of acrylamide, 5.1% of N-vinylpyrrolidone, 13.5% of sodium acrylate, 8.6% of F127, and 2.0% of sodium chloride were dissolved in deionized water, and the pH value was adjusted to 7.0. 14.0% of emulsifier HB246 was dissolved in mineral oil, followed by heating to 50° C.; after dissolution of the comonomers, the oil phase and the aqueous phase (mass ratio, 4.5:5.5) were successively added to an agitator to be emulsified homogeneously under stirring. After the emulsification was completed, the mixture was transferred to a 250 mL four-necked bottom flask equipped with a stirrer, a nitrogen inlet, and a digital thermometer, and the temperature was increased to 45° C. in a water bath. After purging with nitrogen gas for a certain duration, the initiator AIBN was added, and the polymerization was started. When the temperature reached 45° C., the mixture was continuously stirred at 45° C. for 2 hours. The inverse emulsion ETVP-P6 of the anionic thermoviscosifying water-soluble polymers was obtained, and the obtained dry powder of the polymer was TVP-P6.

Example 26

For preparing an aqueous phase, 31.7% (w/w, the same hereinafter) of acrylamide, 9.5% of sodium acrylate, 8.6% of F127, and 5.0% of sodium chloride were dissolved in deionized water, and the pH value was adjusted to 7.0. 14.0% of emulsifier HB206 was dissolved in mineral oil, followed by heating to 50° C.; after dissolution of the comonomers, the oil phase and the aqueous phase (mass ratio, 4.5:5.5) were successively added to an agitator to be emulsified homogeneously under stirring. After the emulsification was completed, the mixture was transferred to a 250 mL four-necked bottom flask equipped with a stirrer, a nitrogen inlet, and a digital thermometer, and the temperature was increased to 45° C. in a water bath. After purging with nitrogen gas for a certain duration, the initiator AIBN was added, and the polymerization was started. When the temperature reached 45° C., the mixture was continuously stirred for 2 hours. The inverse emulsion ETVP-P7 of the anionic thermoviscosifying water-soluble polymers was obtained, and the obtained dry powder of the polymer was TVP-P7.

Example 27

For preparing an aqueous phase, 31.7% (w/w, the same hereinafter) of acrylamide, 7.5% of 2-acrylamide-2-methyl-propanesulfonic acid sodium, 8.6% of F127, and 7.0% of sodium chloride were dissolved in deionized water, and the pH value was adjusted to 7.0. 14.0% of emulsifier HB246 was dissolved in mineral oil, followed by heating to 50° C.; after dissolution of the comonomers, the oil phase and the aqueous phase (mass ratio, 4.5:5.5) were successively added to an agitator to be emulsified homogeneously under stirring. After the emulsification was completed, the mixture was transferred to a 250 mL four-necked bottom flask equipped with a stirrer, a nitrogen inlet, and a digital thermometer, and the temperature was increased to 45° C. in a water bath. After purging with nitrogen gas for a certain duration, the initiator AIBN was added, and the polymerization was started. When the temperature reached 45° C., the mixture was continuously stirred at 45° C. for 2 hours. The inverse emulsion ETVP-P8 of the anionic thermoviscosifying water-soluble polymers was obtained, and the obtained dry powder of the polymer was TVP-P8.

Example 28

For preparing an aqueous phase, 31.7% (w/w, the same hereinafter) of acrylamide, 9.5% of sodium acrylate, 8.6% of F127, and 5.0% of sodium acetate were dissolved in deionized water, and the pH value was adjusted to 7.0. 14.0% of emulsifier HB246 was dissolved in mineral oil, followed by heating to 50° C.; after dissolution of the comonomers, the oil phase and the aqueous phase (mass ratio, 4.5:5.5) were successively added to an agitator to be emulsified homogeneously under stirring. After the emulsification was completed, the mixture was transferred to a 250 mL four-necked bottom flask equipped with a stirrer, a nitrogen inlet, and a digital thermometer, and the temperature was increased to 45° C. in a water bath. After purging with nitrogen gas for a certain duration, the initiator AIBN was added, and the polymerization was started. When the temperature reached 45° C., the mixture was continuously stirred at 45° C. for 2 hours. The inverse emulsion ETVP-P9 of the anionic thermoviscosifying water-soluble polymers was obtained, and the obtained dry powder of the polymer was TVP-P9.

Example 29

0.20 g of dry powder of polymer TVP-P1 obtained in example 19 was added into 99.80 g of deionized water under mechanical agitation at 600 rpm. The mixture was sampled during a designed interval, and the corresponding viscosity was measured using an Anton Paar rheometer MCR 302 until the viscosity of the emulsion-diluted solution reached constant.

Example 30

50 g of the inverse emulsion ETVP-P1 obtained in example 19 was demulsified with 1.5 g Hypinvert 3110, and the mixture was homogeneously mixed by continuous shaking for 1 hour in a shaker. 106.0 g of water was added to a beaker under mechanical agitation at 600 rpm. 2.0 g of the emulsion after homogenous mixing was directly injected into stirred water along the vortex shoulder. The mixture was sampled during a designed interval, and the corresponding viscosity was measured using an Anton Paar rheometer MCR 302 until the viscosity of the emulsion-diluted solution reached constant.

Figure 10:
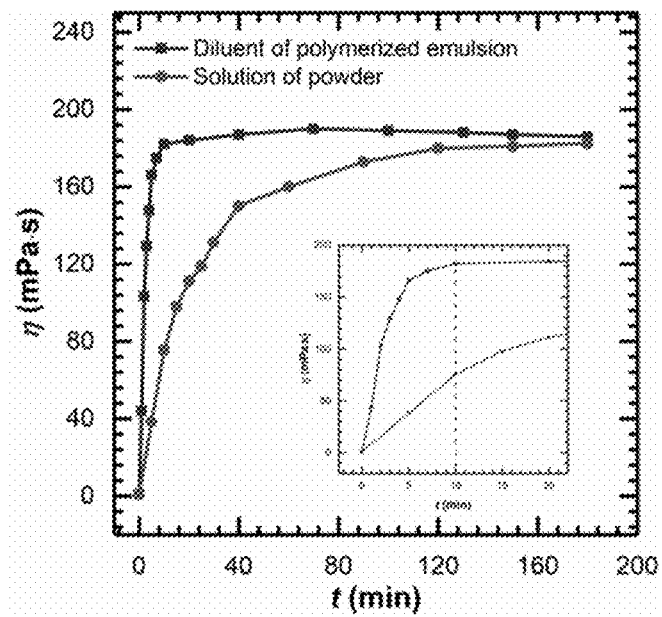
FIG. 10 is showing dissolution rate curves (pure water, 25° C., $\dot{\gamma}=10$ s$^{-1}$) of an aqueous solution of TVP-P1 powder, and an emulsion-diluted solution (0.20%) of ETVP-P1 according to example 29 and example 30.

The variation in viscosity with increasing temperature corresponding to example 29 and example 30 is depicted in FIG. 10. The emulsion polymer can be rapidly dispersed and dissolved in water within 10 minutes, while the polymer powder requires 120 minutes to be dissolved in water. Therefore, the emulsion polymer obtained by the inverse emulsion polymerization can be directly dispersed in water, which is more convenient for practical use.

Example 31

0.75 g of dry powder of polymer TVP-P1 obtained in example 19 was dissolved in 499.25 g of 0.45% NaCl (w/w) aqueous solution under agitation at 100 rpm, it took 24 hours for complete dissolution. Under nitrogen gas atmosphere, such a prepared solution from the dry powder of TVP-P1 was placed in a glove box for further degassing to ensure oxygen content of the solution was less than 2 mg·L$^{-1}$. The solution was then transferred to a sealed stainless-steel cylinder, and aged in an oven at 45° C. In order to ensure that no oxygen was penetrated into the solution, polymer solution was sampled from the cylinder in the glove box, and the corresponding viscosity was measured using the Anton Paar rheometer MCR 302 to obtain the corresponding aging curve of the polymer solution of TVP-P1 powders.

Example 32

As a reference, 1.00 g of dry powder of polymer PAMA obtained in example 24 was dissolved in 499.00 g of 0.45% NaCl (w/w) aqueous solution under agitation speed of 100 rpm, and a dissolution time was 24 hours. Under nitrogen gas atmosphere, such a prepared solution from the dry powder PAMA was placed in a glove box for further degassing to ensure the oxygen content of the solution less than 2 mg·L$^{-1}$. The solution was then transferred to a sealed stainless-steel cylinder for a long-term aging stability monitoring in an oven at 45° C. In order to ensure that no oxygen was penetrated into the solution, polymer solution was sampled from the cylinder in the glove box, and the corresponding viscosity was measured using the Anton Paar rheometer MCR 302 to obtain the corresponding aging curve of the polymer solution of PAMA powders.

Figure 11:
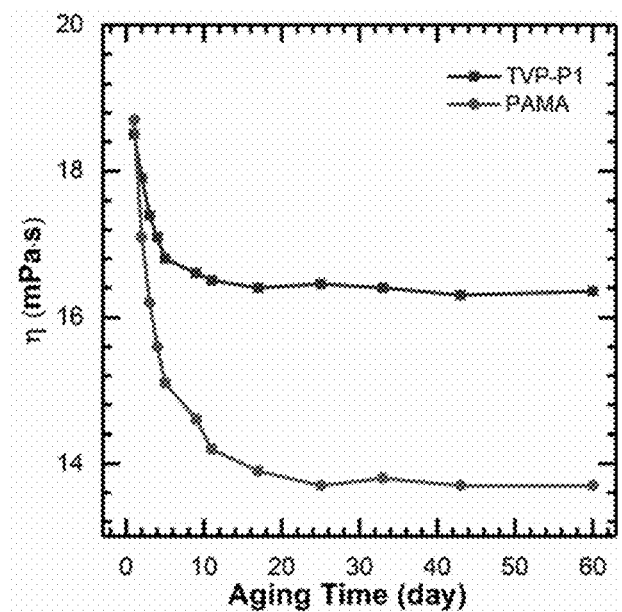
FIG. 11 is showing aging curves (0.45% NaCl solution, T=45° C., $\dot{\gamma}=10$ s$^{-1}$) of an aqueous solution (0.15%) of TVP-P1 powder obtained in example 31 and an aqueous solution (0.20%) of PAMA powder obtained in example 32.

The comparison of the aging results corresponding to example 31 and example 32 is shown in FIG. 11. The viscosity of both polymer solutions is the same at an initial stage of aging, but the long-term thermal stability TVP-P1 solution is higher than that of the PAMA solution over continuous aging.

Example 33

2.50 g of the inverse emulsion ETVP-P1 containing reverse demulsifier, obtained in example 30, was dispersed in 497.50 g of 0.45% NaCl (w/w) aqueous solution under stirring at 600 rpm, and it took 10 minutes to be completely dissolved. Under nitrogen gas atmosphere, such a prepared emulsion-diluted solution ETVP-P1 was placed in a glove box for further degassing to ensure oxygen content less than 2 mg·L$^{-1}$. The solution was then transferred to a sealed stainless-steel cylinder, and aged in an oven at 45° C. In order to ensure that no oxygen has penetrated into the solution, the polymer solution was sampled in a certain interval from the cylinder in the glove box, and the corresponding viscosity was measured using the Anton Paar rheometer MCR 302 to obtain a corresponding aging curve of emulsion-diluted solution of ETVP-P1.

Figure 12:
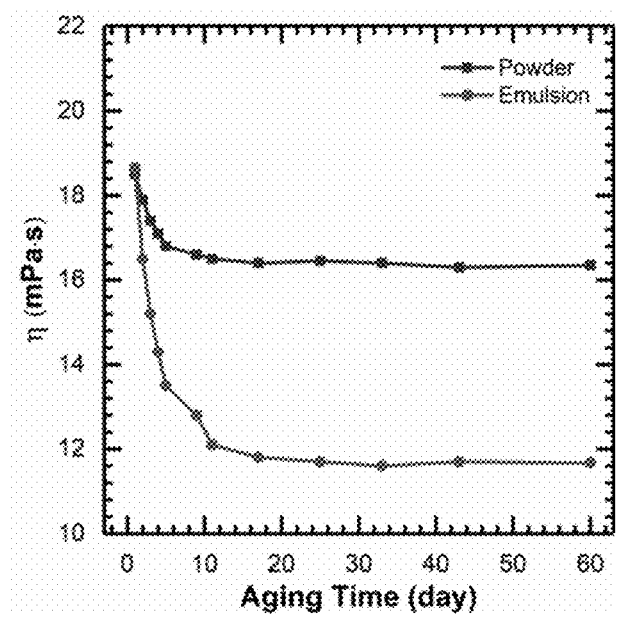
FIG. 12 is showing aging curves (0.45% NaCl solution, T=45° C., =10 s$^{-1}$) of an aqueous solution (0.15%) of TVP-P1 powder obtained in example 31 and an emulsion-diluted solution (0.10%) of ETVP-P1 obtained in example 33.

The comparison of the aging results corresponding to example 31 and example 33 is shown in FIG. 12. The viscosity of both polymer solutions is the same at an initial stage of aging, but the long-term thermal stability of TVP-P1 solution is higher than that of the emulsion-diluted solution from ETVP-P1 over continuous aging.

Example 34

0.75 g of TVP-P1 dry powder obtained in example 19 was dissolved in 499.25 g of 0.45% NaCl (w/w) aqueous solution under stirring at 100 rpm, and it took 24 hours to get complete dissolution. The prepared solution was then filtered through a G3-level sand funnel to remove any undissolved residues. After the core was saturated with the 0.45% NaCl aqueous solution, the temperature in the core flooding chamber was set at 45° C. Next, the 0.45% NaCl aqueous solution was injected into the core at a rate of 1 mL·min$^{-1}$ until the pressure difference remained constant. Then the TVP-P1 solution was injected to displace saline water in the core at a rate of 1 mL·min$^{-1}$ until the pressure difference reached to a constant value. Finally, the 0.45% NaCl aqueous solution was injected to displace polymer solution slug at a rate of 1 mL·min$^{-1}$ until the pressure difference was unchanged. A curve of pressure difference was plotted against corresponding injected pore volume amount was plotted to reflect the propagation of TVP-P1 solution through the core.

Example 35

As a reference, 1.00 g of PAMA dry powder of the polymer obtained in example 24 was dissolved in 499.00 g of 0.45% (w/w) NaCl aqueous solution under stirring at the rate of 100 rpm, and it took 24 hours to get a complete dissolution. The prepared PAMA was then filtered through a G3-level sand funnel to remove any undissolved residues. After the core was saturated with 0.45% NaCl aqueous solution, the temperature in the core flooding chamber was set at 45° C. Next, the 0.45% NaCl aqueous solution was injected into the core at a rate of 1 mL·min$^{-1}$ until the pressure difference remained constant. Then the PAMA solution was injected to displace the saline water slug at a rate of 1 mL·min$^{-1}$ until the pressure difference was unchanged. Finally, the 0.45% NaCl aqueous solution was injected to displace polymer solution slug at a rate of 1 mL·min$^{-1}$ until the pressure difference was unchanged. A curve of pressure difference was plotted against corresponding injection pore volume is plotted to reflect the propagation of PAMA solution through the core.

Figure 13:
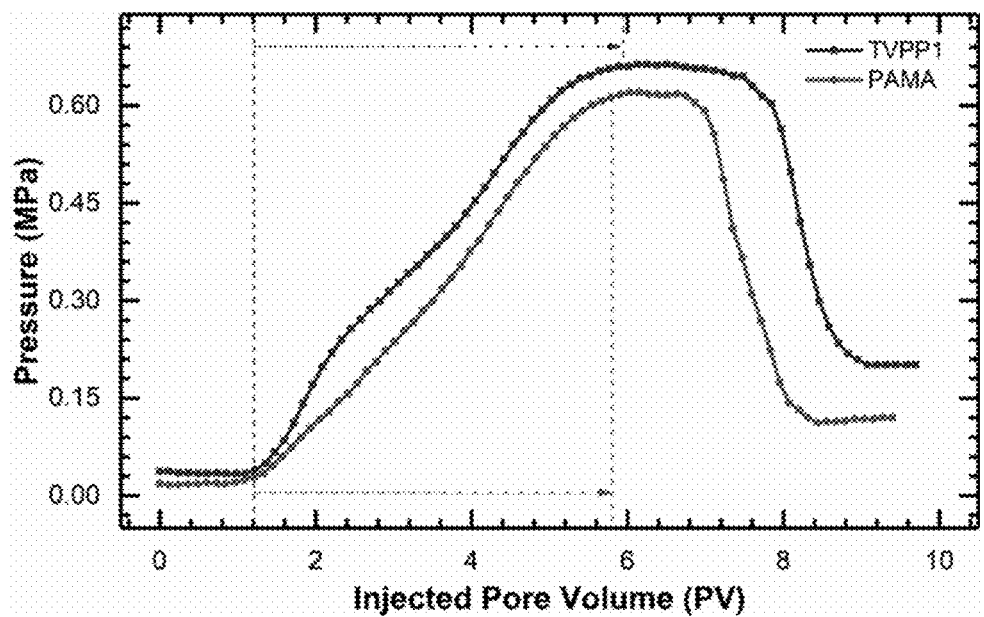
FIG. 13 is showing flowing curves (0.45% NaCl solution, T=45° C.) of an aqueous solution (0.15%) of TVP-P1 powder obtained in example 34 and an aqueous solution (0.20%) of PAMA powder obtained in example 35.

The comparison of the transportation of both polymer solutions corresponding to example 34 and example 35 in the cores is shown in FIG. 13. The resistance factor and residual resistance factor of TVP-P1 solution are higher than those of PAMA solution, suggesting the sweep efficiency of TVP-P1 solution is higher than that of PAMA solution, and the oil recovery factor from TVP-P1 solution may be higher than that of PAMA solution.

Example 36

2.50 g of ETVP-P1 inverse emulsion containing reverse demulsifier, obtained in example 30, was dispersed in 497.50 g of 0.45% (w/w) NaCl aqueous solution under stirring at 600 rpm, and it took 10 minutes to get complete dissolution. The prepared emulsion-diluted solution was then filtered through a G3-level sand funnel to remove any undissolved residues. After the core was saturated with 0.45% NaCl aqueous solution, the temperature in the core flooding chamber was set at 45° C. Next, the 0.45% NaCl aqueous solution was injected into the core at a rate of 1 mL·min$^{-1}$ until the pressure difference reached constant. Then the ETVP-P1 emulsion-diluted solution was injected to displace the saline water slug at a rate of 1 mL·min$^{-1}$ until the pressure difference was unchanged. Finally, the 0.45% NaCl aqueous solution was injected to displace the polymer solution slug at 1 mL·min$^{-1}$ until the pressure difference was unchanged. A curve of pressure difference was plotted against corresponding injection pore volume was plotted to reflect the propagation of ETVP-P1 emulsion-diluted solution through the core.

Figure 14:
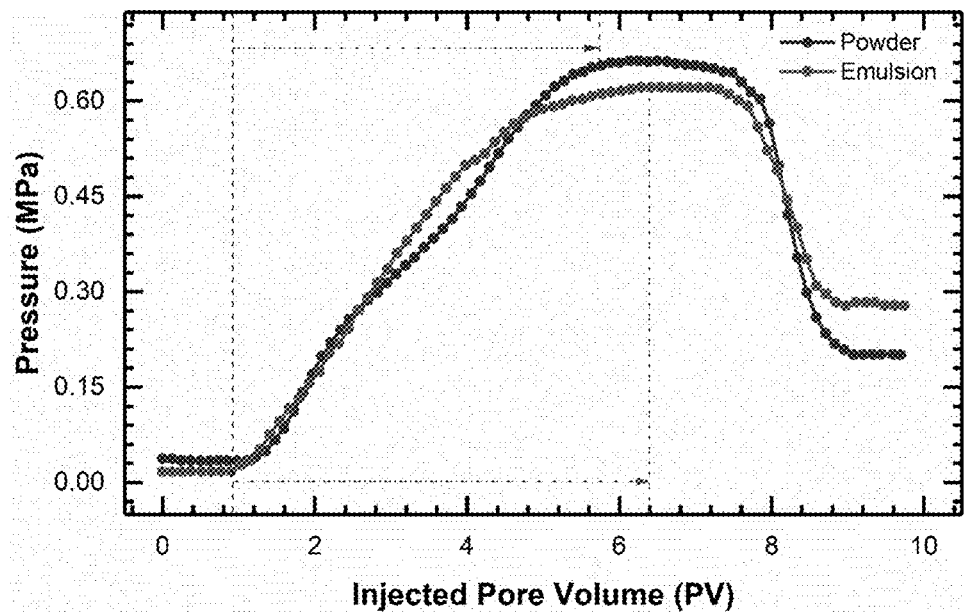
FIG. 14 is showing flowing curves (0.45% NaCl solution, T=45° C.) of an aqueous solution (0.15%) of TVP-P1 powder obtained in example 34 and an emulsion-diluted solution (0.10%) of ETVP-P1 obtained in example 36.

The comparison of the transportation of both polymer solutions corresponding to example 34 and example 36 is shown in FIG. 14. The resistance factor and residual resistance factor of the TVP-P1 solution are higher than those of the ETVP-P1 emulsion-diluted solution, suggesting the sweep efficiency of the solution prepared from dry powder of TVP-P1 is higher than that of the emulsion-diluted solution from ETVP-P1, and the oil recovery factor of the solution prepared from the dry powder of TVP-P1 may be higher than that of the emulsion-diluted solution of ETVP-P1.

Example 37

0.75 g of dry powder of TVP-P1 obtained in example 19 was dissolved in 499.25 g of 0.45% (w/w) NaCl aqueous solution under stirring at 100 rpm, and it took 24 hours to get complete dissolution. The prepared solution from TVP-P1 dry powder was then filtered through a G3-level sand funnel to remove any undissolved residues. After the core was saturated with 0.45% NaCl aqueous solution, the temperature in the core flooding chamber was set at 45° C. for core flooding experiments.

First, the core was saturated with crude oil. Then, 0.45% NaCl aqueous solution was injected to displace crude oil at 1 mL·min$^{-1}$ until the water cut was higher than 98%. Next, 0.5 pore volume (PV) TVP-P1 solution was injected to displace oil at 1 mL·min$^{-1}$. Finally, the 0.45% NaCl aqueous solution was injected to displace the polymer solution slug at 1 mL·min$^{-1}$ as a subsequent water displacement until the water cut higher than 98%. The curves of pressure difference, the oil recovery factor was plotted against corresponding pore volume of saline water pre-flooding, polymer solution and saline water post-flooding to reflect both injectivity and oil recovery efficiency by TVP-P1.

Example 38

As a reference, 1.00 g of PAMA dry powder obtained in example 24 was dissolved in 499.00 g of 0.45% (w/w) NaCl aqueous solution under stirring at 100 rpm, and it took 24 hours to get complete dissolution. The prepared PAMA solution was then filtered through a G3-level sand funnel to remove any undissolved residues. After the core was saturated with 0.45% NaCl aqueous solution, the temperature in core flooding chamber system was set at 45° C. for core flooding experiments.

First, the core was saturated with crude oil. Then, 0.45% NaCl aqueous solution was injected to displace crude oil at 1 mL·min$^{-1}$ until the water cut was higher than 98%. Next, 0.5 PV of PAMA solution was injected to displace cure oil at a rate of 1 mL·min$^{-1}$. Finally, 0.45% NaCl aqueous solution was injected to displace polymer solution at a rate of 1 mL·min$^{-1}$ as a post water flooding until the water cut is higher than 98%. The curves of pressure difference, the oil recovery factor was plotted against corresponding pore volume of saline water pre-flooding, polymer solution and saline water post-flooding to reflect both injectivity and oil recovery efficiency by PAMA.

Figure 15:
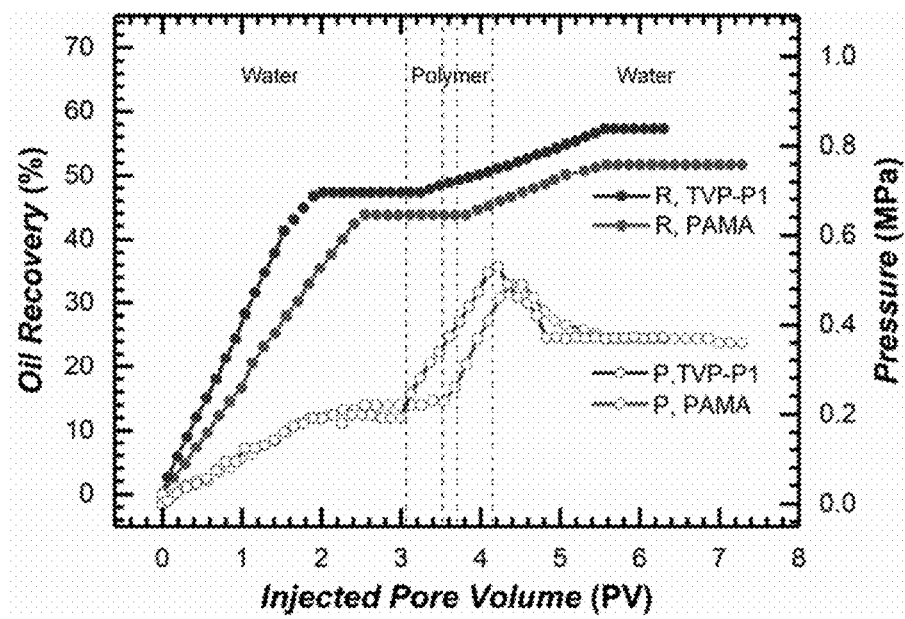
FIG. 15 is showing core flooding curves (0.45% NaCl solution, T=45° C.) of an aqueous solution (0.15%) of TVP-P1 powder obtained in example 37 and an aqueous solution (0.20%) of PAMA powder obtained in example 38 (R, Recovery factor; F, Pore pressure, i.e., pressure difference between inlet and outlet in porous media during a polymer flooding process)

The comparison of the core flooding experiments from TVP-P1 and PAMA obtained from example 37 and example 38 is shown in FIG. 15. The oil recovery efficiency by the polymer solution prepared from TVP-P1 was 10.0%, while that of polymer solution prepared from dry powder of PAMA was 7.9%, indicating that the smart thermoviscosifying polymer, TVP-P1, showed stronger capacity to increase oil recovery than normal polymer, PAMA.

Example 39

2.50 g of the inverse emulsion ETVP-P1 containing reverse demulsifier obtained in example 30 was dispersed in 497.50 g of 0.45% (w/w) NaCl aqueous solution under stirring at 600 rpm, and it took only 10 minutes to get complete dissolution. The prepared emulsion-diluted solution was filtered through a G3-level sand funnel to remove any undissolved residues. After the core was saturated with 0.45% NaCl aqueous solution, the temperature in the core flooding chamber was set at 45° C. for further core flooding experiments.

First, the core was saturated with crude oil. Then, the 0.45% NaCl aqueous solution was injected to displace crude oil at 1 mL·min$^{-1}$ until the water cut is higher than 98%. Next, 0.5 PV of ETVP-P1 emulsion-diluted solution was injected to displace crude oil at 1 mL·min$^{-1}$. Finally, 0.45% NaCl aqueous solution was injected as post water flooding to displace polymer solution slug at 1 mL·min$^{-1}$ until the water cut was higher than 98%. The curves of pressure difference, the oil recovery factor was plotted against corresponding pore volume saline water pre-flooding, polymer solution and saline water post-flooding to reflect both injectivity and oil recovery efficiency by ETVP-P1.

Figure 16:
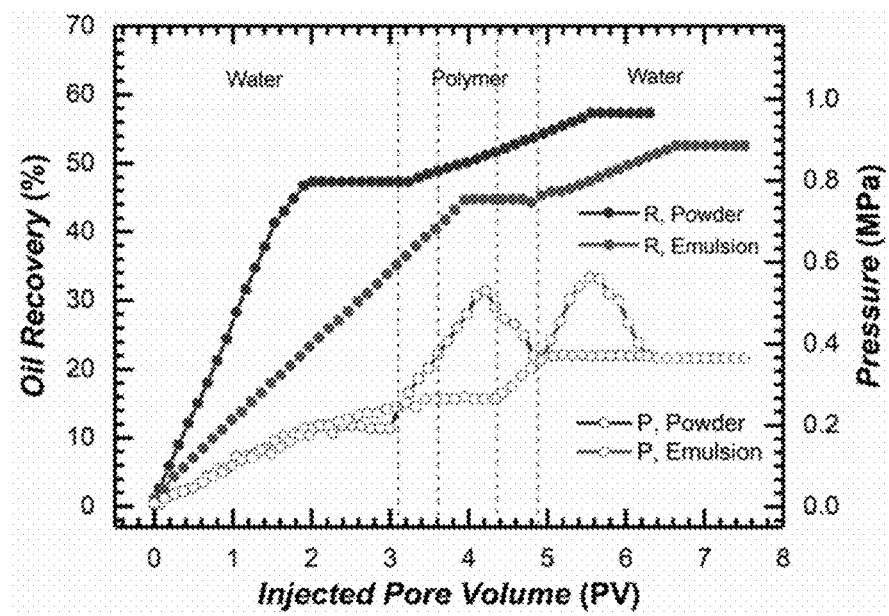
FIG. 16 is showing core flooding curves (0.45% NaCl solution, T=45° C.) of an aqueous solution (0.15%) of TVP-P1 powder obtained in example 37 and a diluted emulsion solution (0.10%) of ETVP-P1 obtained in example 39 (R, Recovery factor; F, Pore pressure, i.e., pressure difference between inlet and outlet in porous media during a polymer flooding process).

The comparison of the core flooding experiments corresponding to TVP-P1 and ETVP-P1 obtained from example 37 and example 39 is shown in FIG. 16. The oil recovery factor by TVP-P1 was 10.0%, while that from emulsion ETVP-P1 was 7.9%, indicating that the solution of the dry powder of TVP-P1 has a higher oil recovery efficiency compared to emulsion polymer.

What is claimed is:
1. A method for preparing an anionic thermoviscosifying water-soluble polymer, comprising the following steps:
   (1) preparing an aqueous phase with an acrylamide monomer, an anionic monomer, a temperature-sensitive polyether, an inorganic salt, and deionized water, with pH values in between 6.5 and 7.5;
   preparing an oil phase by adding an emulsifier to an oil; wherein a percentage of the aqueous phase ranges from 10% to 90% based on a total mass of both the aqueous phase and the oil phase;
   obtaining an emulsion by uniformly mixing the aqueous phase and the oil phase under stirring or gradually adding the aqueous phase to the oil phase to be emulsified;
   adding an initiator in the emulsion under an inert gas atmosphere to form an emulsion system;
   increasing a temperature of the emulsion system to 40-60° C. to initiate a polymerization, or performing a photo-initiated polymerization on the emulsion by heating the emulsion to 40-60° C. without adding the initiator; and
   after completing the polymerization or the photo-initiated polymerization, keeping the temperature for 2-6 hours to obtain an inverse emulsion of the anionic thermoviscosifying water-soluble polymer;
   wherein, mass percentages of various components in the aqueous phase are as follows: 20%-50% of the acrylamide monomer, 5%-15% of the anionic monomer, 1%-20% of the temperature-sensitive polyether, and 1%-10% of the inorganic salt; in the oil phase, a mass percentage of the emulsifier is 1%-20%; and
   the emulsifier is a triblock polymeric emulsifier of long-chain fatty acid-polyoxyethylene-long-chain fatty acid, the initiator is at least one selected from the group consisting of a hydrogen peroxide-based initiator, an azo-based initiator, and a benzoin-series initiator; the hydrogen peroxide-based initiator is ammonium peroxide or potassium peroxide, the azo-based initiator is 2,2'-azobis[2-(2-imidazolin-2-yl)propane] dihydrochloride or azobisisobutyronitrile, and the benzoin-series initiator is benzoin dimethyl ether; and an amount of the initiator is 0.006% to 0.3% based on a total mass of the acrylamide monomer, the anionic monomer, and the temperature-sensitive polyether, the anionic monomer is a salt obtained by a neutralization of acrylic acid, methacrylic acid, or 2-acrylamide-2-methylpropanesulfonic acid, and a base used for the neutralization is at least one selected from the group consisting of ammonia water, sodium hydroxide, potassium hydroxide, sodium carbonate, and sodium bicarbonate; and
   (2) precipitating, washing, centrifuging, and drying the inverse emulsion to obtain a dry powder of the anionic thermoviscosifying water-soluble polymer; or adding a reverse demulsifier to the inverse emulsion to obtain an emulsion of the anionic thermoviscosifying water-soluble polymer, followed by dissolution in water and dilution to obtain desired diluted solutions,
   wherein the temperature-sensitive polyether is a triblock polymer of polyoxyethylene-polyoxypropylene-polyoxyethylene with a structural formula of:

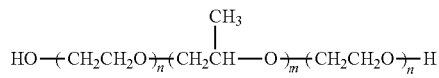

wherein a structure and a property of the temperature-sensitive polyether vary with values of m and n.
2. The method for preparing the anionic thermoviscosifying water-soluble polymer of claim 1, wherein, the acrylamide monomer is acrylamide or a mixture of acrylamide and another monomer, wherein the other monomer is at least one selected from the group consisting of methacrylamide, N,N-dimethylacrylamide, methyl acrylate, ethyl acrylate, methyl methacrylate, ethyl methacrylate, and N-vinylpyrrolidone; and a mass percentage of the acrylamide in the mixture is greater than 50%.

3. The method for preparing the anionic thermoviscosifying water-soluble polymer of claim 1, wherein, the inorganic salt is at least one selected from the group consisting of sodium chloride, sodium acetate, sodium nitrate, and potassium nitrate.

4. The method for preparing the anionic thermoviscosifying water-soluble polymer of claim 1, wherein, the oil is at least one selected from the group consisting of a cycloalkane, an aromatic hydrocarbon, a linear saturated hydrocarbon and a linear unsaturated hydrocarbon.

5. An anionic thermoviscosifying water-soluble polymer prepared by the method of claim 1, wherein a molecular weight of the anionic thermoviscosifying water-soluble polymer is from greater than $2.0 \times 10^6$ g·mol$^{-1}$ to $8.6 \times 10^6$ g·mol$^{-1}$.

6. A method of a polymer flooding in an enhanced oil recovery, comprising the step of injecting the anionic thermoviscosifying water-soluble polymer of claim 5 into an underground formation.

7. The anionic thermoviscosifying water-soluble polymer of claim 5, wherein, the acrylamide monomer is acrylamide or a mixture of acrylamide and another monomer, wherein the other monomer is at least one selected from the group consisting of methacrylamide, N,N-dimethylacrylamide, methyl acrylate, ethyl acrylate, methyl methacrylate, ethyl methacrylate, and N-vinylpyrrolidone; and a mass percentage of the acrylamide in the mixture is greater than 50%.

8. The anionic thermoviscosifying water-soluble polymer of claim 5, wherein, the inorganic salt is at least one selected from the group consisting of sodium chloride, sodium acetate, sodium nitrate, and potassium nitrate.

9. The anionic thermoviscosifying water-soluble polymer of claim 5, wherein, the oil is at least one selected from the group consisting of a cycloalkane, an aromatic hydrocarbon, a linear saturated hydrocarbon and a linear unsaturated hydrocarbon.

\* \* \* \* \*